(12) United States Patent
Bracht et al.

(10) Patent No.: US 9,458,944 B2
(45) Date of Patent: Oct. 4, 2016

(54) HYDRAULIC SAFETY AND MOVEMENT CONTROL SYSTEM

(71) Applicant: Robert Bosch GmbH, Stuttgart (DE)

(72) Inventors: Dirk Bracht, Hasselroth-Niedermittlau (DE); Helmut Fischer, Linsengericht (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 14/181,248

(22) Filed: Feb. 14, 2014

(65) Prior Publication Data

US 2014/0230926 A1 Aug. 21, 2014

(30) Foreign Application Priority Data

Feb. 20, 2013 (DE) .................. 10 2013 002 862
Mar. 15, 2013 (DE) .................. 10 2013 004 437

(51) Int. Cl.
| | |
|---|---|
| *F16K 31/06* | (2006.01) |
| *F16K 17/02* | (2006.01) |
| *F15B 20/00* | (2006.01) |
| *F15B 11/00* | (2006.01) |
| *F15B 11/042* | (2006.01) |

(52) U.S. Cl.
CPC .............. *F16K 17/02* (2013.01); *F15B 20/008* (2013.01); *F15B 11/006* (2013.01); *F15B 11/0426* (2013.01); *F15B 2211/3058* (2013.01); *F15B 2211/30575* (2013.01); *F15B 2211/328* (2013.01); *F15B 2211/40592* (2013.01); *F15B 2211/427* (2013.01); *F15B 2211/7054* (2013.01); *F15B 2211/855* (2013.01); *F15B 2211/863* (2013.01); *F15B 2211/8752* (2013.01); *F15B 2211/8757* (2013.01); *Y10T 137/7781* (2015.04)

(58) Field of Classification Search
CPC ............. F16K 17/02; Y10T 137/7781; F15B 11/024; F15B 2011/0243; F15B 20/008
USPC ............. 137/596.14–596.18, 599.03–599.05, 137/599.07; 251/31; 91/445, 447
See application file for complete search history.

(56) References Cited

U.S. PATENT DOCUMENTS

| | | | | |
|---|---|---|---|---|
| 3,750,694 | A * | 8/1973 | Fawkes ............... | F16K 31/1635 137/236.1 |
| 3,905,393 | A * | 9/1975 | Hartwig ............... | F15B 13/043 137/596.14 |
| 4,030,523 | A * | 6/1977 | Cram ................... | A23G 9/228 137/599.07 |
| 4,169,490 | A * | 10/1979 | Taplin ................ | F15B 13/0405 137/596.15 |

(Continued)

FOREIGN PATENT DOCUMENTS

WO 2012/062404 A1 5/2012

*Primary Examiner* — Marina Tietjen
*Assistant Examiner* — Umashankar Venkatesan
(74) *Attorney, Agent, or Firm* — Maginot, Moore & Beck LLP

(57) ABSTRACT

A hydraulic safety and movement control system has an actuating cylinder or a hydraulic motor which serves to set a fitting which is preferably relevant to safety and by means of which a fluid flow, for example of a power plant or of a turbine is regulated. The system has a hydraulic control arrangement by means of which a piston or a piston rod of the actuating cylinder or a motor shaft of the hydraulic motor can be moved continuously in a control mode or normal mode. Furthermore, the system has a hydraulic safety arrangement or safety circuit by means of which the piston and/or the piston rod or the motor shaft and therefore the fitting can be moved into a predetermined safe position in the event of a system failure or in an emergency mode.

15 Claims, 3 Drawing Sheets

(56) References Cited

U.S. PATENT DOCUMENTS

| | | | | |
|---|---|---|---|---|
| 4,416,187 A * | 11/1983 | Nystrom Per | ........ | F15B 21/087 91/361 |
| 4,492,251 A * | 1/1985 | Blake | .................... | F16D 48/062 137/596.16 |
| 4,518,011 A * | 5/1985 | Stoll | ................... | F15B 11/0426 137/596 |
| 4,535,809 A * | 8/1985 | Andersson | ............ | F15B 11/006 137/596.14 |
| 4,644,849 A * | 2/1987 | Tanaka | ................ | F16H 61/4157 60/466 |
| 5,081,903 A * | 1/1992 | Wardle | .................... | F15B 13/07 137/596.15 |
| 5,979,498 A * | 11/1999 | Zenker | ................. | F15B 11/006 137/596.15 |
| 6,629,020 B1 * | 9/2003 | Thomsen | ............. | G01D 5/2216 700/282 |
| 2004/0011192 A1 * | 1/2004 | Frediani | ................ | F15B 11/006 91/459 |

\* cited by examiner

HYDRAULIC SAFETY AND MOVEMENT CONTROL SYSTEM

This application claims priority under 35 U.S.C. §119 to patent application no. DE 10 2013 002 862.0, filed on Feb. 20, 2013 in Germany, and patent application no. DE 10 2013 004 437.5, filed on Mar. 15, 2013 in Germany, the disclosures of which are incorporated herein by reference in their entirety.

The disclosure relates to a hydraulic safety and movement control system for a fitting which is relevant to safety.

BACKGROUND

Two basic requirements are made of such systems for fittings which are relevant to safety and which are installed, for example, in a power plant or in the chemical industry or in gas production or oil production facilities: in a normal mode the fitting must be continuously (or quasi-continuously) adjustable in order, for example, to regulate large steam flows. In an emergency mode it must be possible to adjust the fitting into a specific (for example closed) safety position even in the event of a failure of the system.

Document WO 2012/062404 discloses such a safety and movement control system for a fitting, in which system the two functions mentioned above are performed by separate hydraulic devices. An actuating cylinder of the fitting is supplied with pressure medium and set by means of a control arrangement in the normal mode. In an emergency, the actuating cylinder is adjusted into the desired position by means of a safety circuit. The safety circuit has seat valves connected in series in its main lines, by means of which the chambers of the actuating cylinder can be connected to high pressure and to low pressure. The control arrangement has a proportional valve for supplying pressure medium to the actuating cylinder in a way which can be metered finely.

A disadvantage with such safety and movement control systems and of other known from the prior art, is that the proportional valve, or even servo valves which are used have internal leakage. As a result, the most frequent causes of failure of these systems are gap filtration and silting. In the case of gap filtration, very small particles which cannot be filtered out of the oil with an acceptable degree of expenditure cause the control piston of the proportional valve to stick. In the case of silting, the gaps which do not have any flow speeds, or only low flow speeds, are made continuously more narrow by submicron oil components. This can also cause the proportional valve to fail and contributes, in particular, to the sudden failure as a result of gap filtration.

Furthermore, the leakage of the proportional valve makes it necessary to have a seat valve which is connected in series therewith and which serves as a blocking element in the working line. By closing the seat valve, the actuating cylinder and therefore the main valve or the fitting can be held without leakage in precisely the adopted or selected position.

SUMMARY

In contrast with the above, the disclosure is based on the object of providing a hydraulic safety and movement control system whose control arrangement is simpler in terms of device technology and at the same time has more robust operating behavior.

This object is achieved by a hydraulic safety and movement control system having the features described herein.

The hydraulic safety and movement control system has an actuator (for example an actuating cylinder) which serves, for example, to set a main valve which is relevant to safety or a fitting which is relevant to safety and by means of which main valve or fitting a fluid flow, for example of a power plant or of a turbine, is regulated. The main valve or the fitting can be adjusted continuously for this purpose. The system has for this purpose a hydraulic control arrangement which is preferably developed as a control block and by means of which the actuator (for example its piston or its piston rod) can be moved continuously in a control mode or normal mode. Furthermore, the system has a hydraulic safety arrangement or safety circuit which is preferably developed as a safety block by means of which the actuator (for example its piston or its piston rod) can be moved into a predetermined safe position in the event of a system failure or in an emergency mode. In this position, the main valve or the fitting can be open or closed. The safety arrangement has in this context one or more main lines. It is possible to provide, for example, a main line which connects two chambers of the actuating cylinder to one another, or one or more main lines can be provided by means of which one or more chambers of the actuating cylinder can be connected to high pressure or low pressure. The control arrangement is embodied in such a way that it can be used to open or bring about various pressure medium flow paths between the working ports of the actuator on the one hand and high pressure or low pressure on the other. Each main line of the safety arrangement and each pressure medium flow path of the control arrangement can be opened and closed by means of just one seat valve or a plurality of seat valves. If a plurality of seat valves are provided in the main line of the safety arrangement, they are connected in series. If a plurality of seat valves are provided in a pressure medium flow path of the control arrangement, they are connected in parallel. As a result, the system has more robust operating behavior since it can tolerate, for example, more heavily contaminated and older oil.

The pressure medium flow path is to be understood respectively as being precisely a connection between a working port of the actuator and high pressure or between a working port of the actuator and low pressure. If the actuator has two working ports, the control arrangement according to the disclosure has four such connections which can be implemented in certain sections by means of the two working lines.

One preferred development of the system has precisely one seat valve per working line of the control arrangement, which seat valve can be actuated ballistically by the electronics. Since the seat valve is free of leakage, no additional blocking element is necessary, as a result of which the expenditure for the system in terms of device technology is minimized.

The robust operating behavior according to the disclosure is also achieved with a plurality of ballistic seat valves which are connected in parallel in every working line of the control arrangement.

In this context, it is particularly preferred if a self-testing safety block (STS block according to WO 2012/062404) of a comparatively large nominal size is arranged parallel to the one or more seat valves in each connection. This safety block can be connected by means of an intermediate plate to the pump port and to the tank port of each connection and therefore permit an uncontrolled movement of the actuator into the desired target position at a comparatively high speed. Both directions or the use of differential cylinders or multi-position (fluid or vapor) valves require a respectively appropriately adapted STS block combination. Shortly before the target position of the actuator is reacted, the inflow via the STS block is stopped (the valves are closed again) and the seat valve or valves which are comparatively small and can be actuated ballistically perform the targeted movement/fine positioning of the actuator. A further advantage of this arrangement is the functional checking of the uncontrolled valves without bringing about a movement at the actuator in the process. In the worst case, when the ballistically actuated fine-positioning valve fails, rudimentary actuating functions would therefore still be available. In contrast, with the comparatively small ballistic seat valve, movements can take place in the μm range, which movements generally do not have a significant influence on the quantity of fluid which passes through the main valve and are already compensated again a few milliseconds later. Therefore, functional monitoring is also possible here. A precondition here is a cross section which is as small as possible and which permits very small movements with a high resolution and in the position sensor on the actuator, which can also map these minimal movements (preferably also in the μm range).

In this context, according to a first variant the plurality of seat valves are actuated ballistically by the electronics.

According to another variant, a plurality of seat switching valves which are actuated in a digital-hydraulic fashion by the electronics are used. As a result, the valves can be opened individually or in groups or all together, as a result of which different stepped summed open cross sections can be made available for adjusting the actuator (quasi-continuous adjustment).

In the two variants, the seat switching valves preferably have different opening cross sections. The fine-adjustment capability of the possible summed opening cross sections is therefore improved.

In the case of n seat switching valves, an optimum fine-adjustment capability is achieved if the opening cross sections Q thereof correspond to the rule $Q_n=2*Q_{n-1}$.

The adjustment capability of the summed opening cross sections of the digital-hydraulic variant is improved further if an equalizing seat valve, which is actuated ballistically by the electronics, is also provided parallel to the seat switching valves.

It is also preferred here if the seat switching valves have different opening cross sections and if a nominal opening cross section of the ballistic equalizing seat valve corresponds approximately to the opening cross section of the smallest seat switching valve.

Ballistic means (in all the specified developments) that a valve body of the seat valve experiences a pulse-like excitation or force which opens the seat valve only briefly. In this context, the nominal opening cross section of the seat valve is often not reached.

The adjustment capability of the summed opening cross sections is eliminated if the opening cross sections Q thereof correspond to the rule $Q_n=2*Q_{n-1}$ and if the nominal opening cross section of the equalizing seat valve corresponds to that of the smallest seat switching valve ($Q_{equal}=Q_1$).

In order to provide maximum protection by doubling the shut-off function of the control arrangement, a further shut-off seat valve or blocking element which is connected in series with respect to the seat valve or valves can be arranged in the working line or lines of the control arrangement.

It is preferred if the at least one seat valve has a failsafe closed position or closed preferred position or means of detecting the closed position which is connected to the electronics. The closed position can therefore be monitored.

In the case of the device of the system according to the disclosure it is advantageous if the one seat valve or at least one of the plurality of seat valves can be actuated and adjustment manually. In this context it is preferred if the seat valve in question is the one with the greatest opening cross section ($Q_n$).

In order to be able to carry out a self-test for the safety arrangement it is preferred if the main line or lines thereof can be opened and closed just by means of a plurality of seat valves, preferably two, connected in series (self-testing safety system STSS). In this context, the function of the two seat valves which are connected in series with respect to one another can be tested successively in that one of the seat valves is continuously kept closed while the other is opened and tested. In this context, the actuator is held in the selected position.

In one particularly preferred application of the disclosed system, the actuator is a double-acting actuating cylinder, in particular synchronizing cylinder whose first chamber can be connected to the high pressure by means of a first pressure medium flow path and by means of one or more first seat valves and to the low pressure by means of a second pressure medium flow path and by means of one or more second seat valves. The second chamber can correspondingly be connected to the high pressure by means of one or more third seat valves and to the low pressure by means of a fourth pressure medium flow path and by means of one or more fourth seat valves. In this context, the first and the second pressure medium flow paths run in certain sections in a common working line which is connected to the first chamber, and the third and fourth pressure medium flow paths run in certain sections in a common working line which is connected to the second chamber.

BRIEF DESCRIPTION OF THE DRAWINGS

In the text which follows, two exemplary embodiments will be described in detail with reference to the figures, in which.

DETAILED DESCRIPTION

Figure 1:
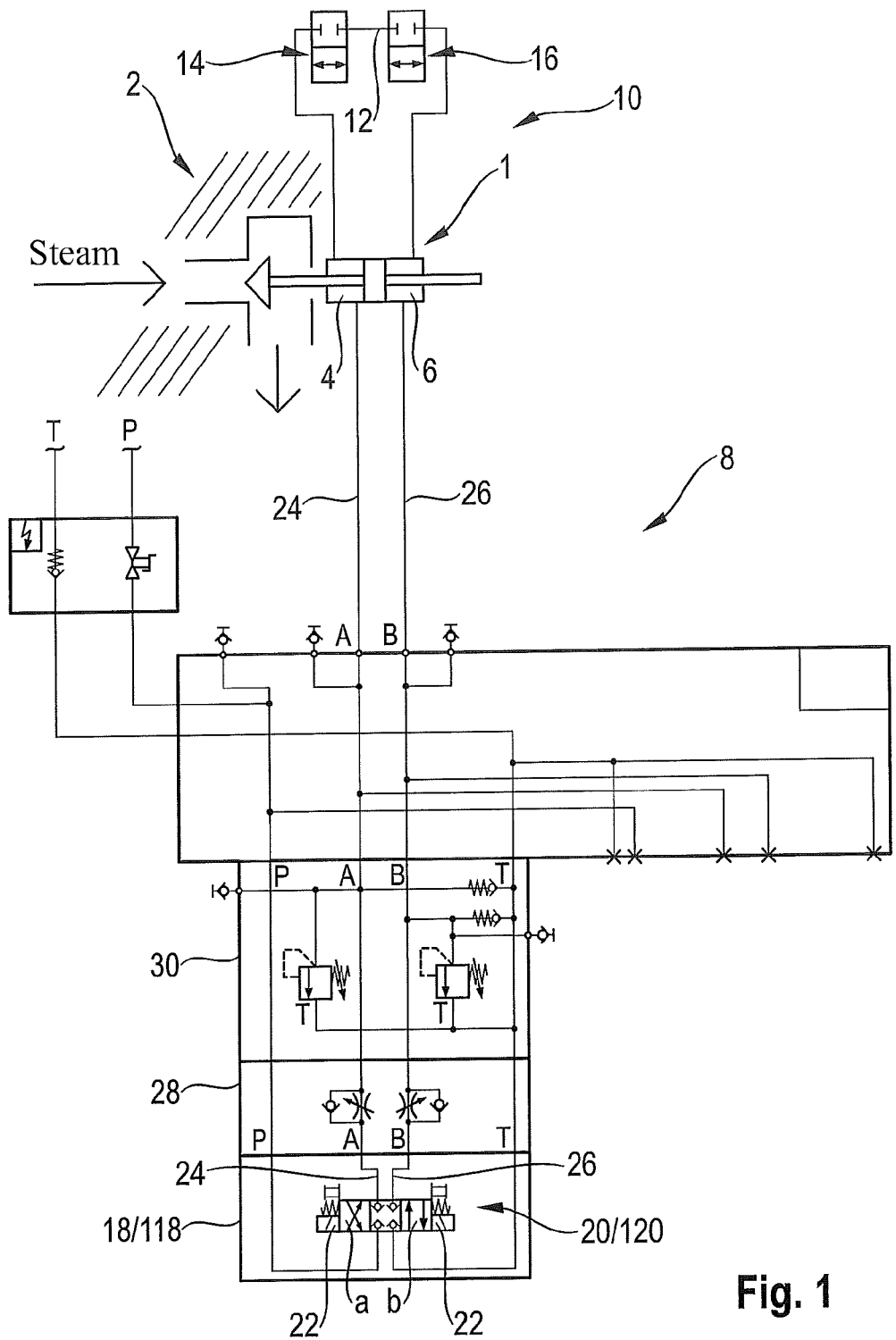
FIG. 1 shows a circuit diagram of the safety and movement control system according to the disclosure according to a first exemplary embodiment.

FIG. 1 shows a circuit diagram of the exemplary embodiment of the safety and movement control system for a power plant with a double-acting actuating cylinder 1 which serves to set a continuously adjustable main valve 2. The main valve 2 is in this exemplary embodiment a steam valve which in a normal mode can assume intermediate positions in order to control the steam flow (according to the arrows). For this purpose, the actuating cylinder 1 has two chambers 4, 6 which are both connected to a control arrangement 8 on the one hand and to a safety arrangement 10 on the other.

In a normal control mode, the two chambers 4, 6 are loaded with pressure medium or relieved by means of the control arrangement 8. In a critical state of the power plant, a maximum opening of the main valve 2 is aimed for. For this purpose, the safety arrangement 10 has a main line 12 which is embodied as a connecting line of the two chambers 4, 6, and two seat valves 14, 16 which are connected in series and which serve as shut-off valves for the main line 12.

The control arrangement 8 has a high-pressure or pump port P and a low-pressure or tank port T which can be connected to working ports A, B essentially via a control block 18; 118 or can be shut off with respect to the latter. To be more precise, the control block 18; 118 has a valve arrangement 20; 120 which is shown in abstract form in FIG. 1 and more precisely in FIGS. 2 and 3. The valve arrangement 20; 120 is connected to the first chamber 4 of the actuating cylinder 4 by means of a working port A and a first working line 24 and to the second chamber 6 of the actuating cylinder 4 by means of a working port B and a second working line 26. In first opening positions a, the valve arrangement 20; 120 permits connection of the pump port P to the second chamber 6 and connection of the first chamber 4 to the tank port T. As a result, the valve body of the main valve 2 is moved in the closing direction. In contrast, by means of opening positions b the pump port P is connected to the first chamber 4, while the second chamber 6 is relieved to the tank port T. As a result, the valve body of the main valve 2 is moved in the opening direction. In the basic position of the valve arrangement 20; 120 which is shown in FIG. 1 and defined by springs, the ports P, T are shut off with respect to the chambers 4, 6. As a result, the valve body of the main valve 2 is held in the current position. In order to set the open positions a and b, the control arrangement 8 has electronics, of which only two lifting magnets 22 are shown by way of example in FIG. 1.

The control arrangement 8 has a block 28 in which a throttle non-return valve is provided for each working line 24, 26. Furthermore, the control arrangement 8 has a block 30 in which a pressure-limiting valve, by means of which the respective working line 24, 26 can be relieved to the tank port T, is provided for each working line 24, 26.

Figure 2:
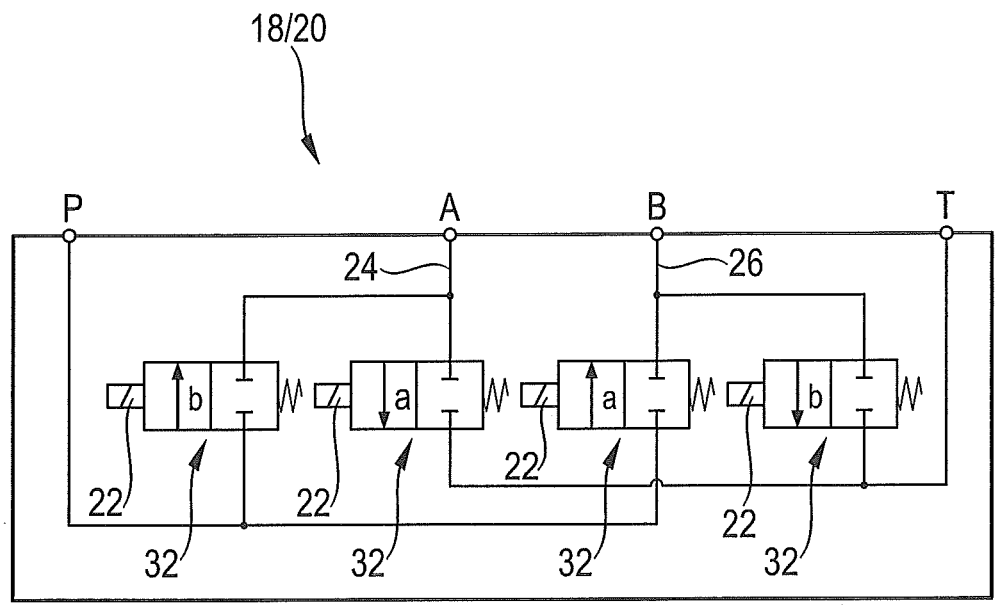
FIG. 2 shows a detail of the safety and movement control system from FIG. 1 with more precise illustration of the seat valves of the control arrangement.

FIG. 2 shows the first exemplary embodiment of the control block 18 with the valve arrangement 20, which is composed of four seat valves 32 which can be actuated ballistically. The seat valves 32 are shown in their basic position which is prestressed by a spring, in which seat valves 32 a respective connection is shut off. In this context, the first seat valve 32 shuts off the connection from the pump port P to the working port A, while the second seat valve 32 shuts off the connection from the working port A to the tank port T. The third seat valve 32 shuts off the connection from the pump port P to the working port B, and the fourth seat valve 32 shuts off the connection from the working port B to the tank port T. As has been explained with reference to FIG. 1, the first working port A is connected to the first chamber 4, while the second port B is connected to the second chamber 6. The respective valve body (not shown in more detail) can be lifted off in a pulse-like fashion from its seat by means of pulse-like energization to the respective lifting magnets 22 via the electronics, wherein the pulse length of the energization determines the opening cross section and/or the opening period of the seat valve 32.

Figure 3:
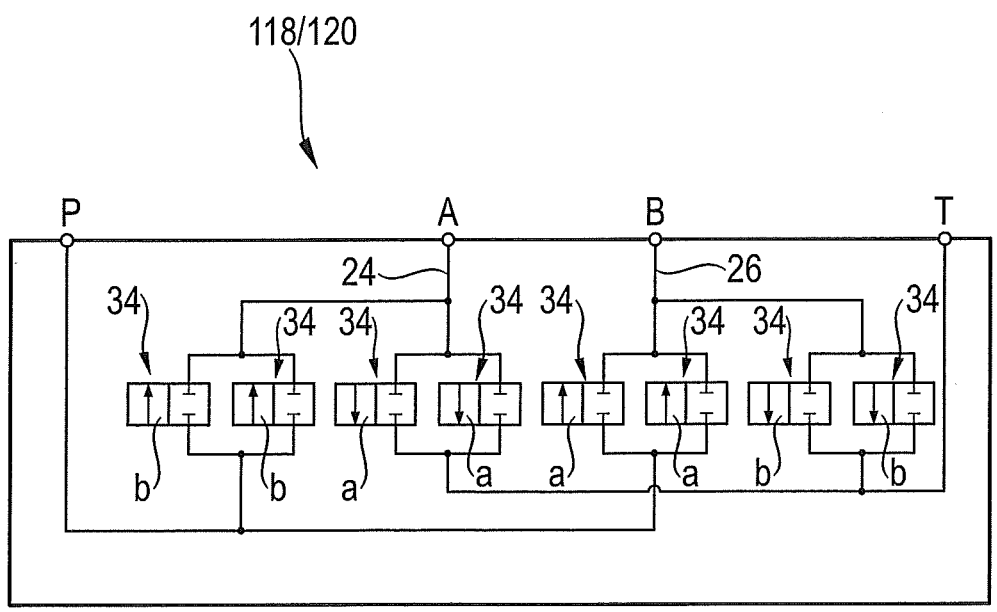
FIG. 3 shows a detail of the safety and movement control system from FIG. 1 with more precise illustration of the seat valves of the control arrangement according to a second exemplary embodiment.

FIG. 3 shows a second exemplary embodiment of the control block 118 with the valve arrangement 120. The significant difference of the second exemplary embodiment with respect to the first exemplary embodiment according to FIG. 2 is that each of the four connections (P→A, A→T, P→B and B→T) can be opened and closed by a multiplicity of seat valves 34 which can be actuated in a digital-hydraulic fashion and embodied as switching valves. In this context, in FIG. 3 only two seat valves 34 are shown by way of example for each connection. The seat valves 34 of a respective connection are arranged or connected in parallel with one another, wherein their opening cross sections are selected with a ratio of 1 to 2 to 4 to 8 etc. By means of a lifting magnet (not shown in FIG. 3) each seat valve 34 can be opened, wherein the respective summed opening cross section is generated by an advantageous combination of opened seat valves 34.

The two exemplary embodiments of the control block 18; 118 according to FIGS. 2 and 3 each therefore permit quasi-continuous adjustment of the actuating cylinder 1 and therefore of the main valve 2 (cf. FIG. 1).

In contrast to the exemplary embodiments shown, the actuator for the main valve 2 can also be a hydraulic motor.

Figure 4:
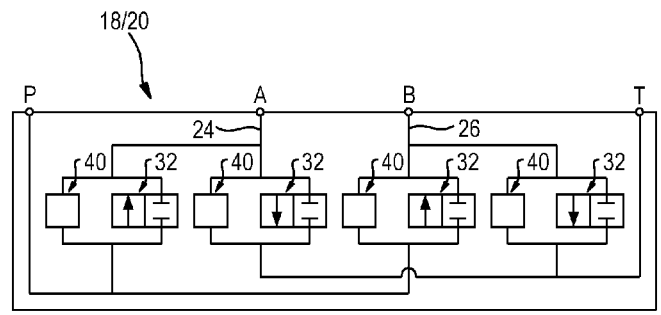
FIG. 4 shows a detail of the safety and movement control system from FIG. 1 with more precise illustration of the seat valves of the control arrangement according to a third exemplary embodiment.

In addition to the first exemplary embodiment according to FIG. 2, a self-testing safety block (STS block) 40 (FIG. 4) can be provided in each of the four connections parallel to the respective seat valve 32 which can be actuated ballistically, which self-testing safety block permits higher through-flow rates than the respective seat valve 32 and therefore rapid movement of the actuating cylinder 1 to its target position.

Figure 5:
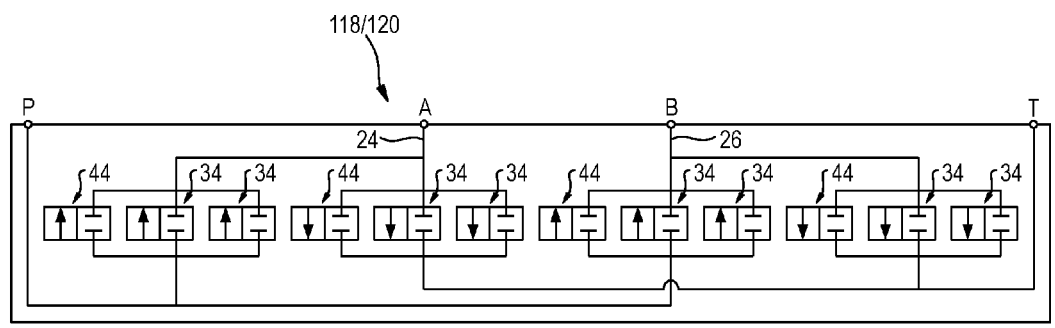
FIG. 5 shows a detail of the safety and movement control system from FIG. 1 with more precise illustration of the seat valves of the control arrangement according to a fourth exemplary embodiment.

The adjustment capability of the summed opening cross sections of the digital-hydraulic variant is improved further if an equalizing seat valve 44 (FIG. 5), which is actuated ballistically by the electronics, is also provided parallel to the seat switching valves 34.

Figure 6:
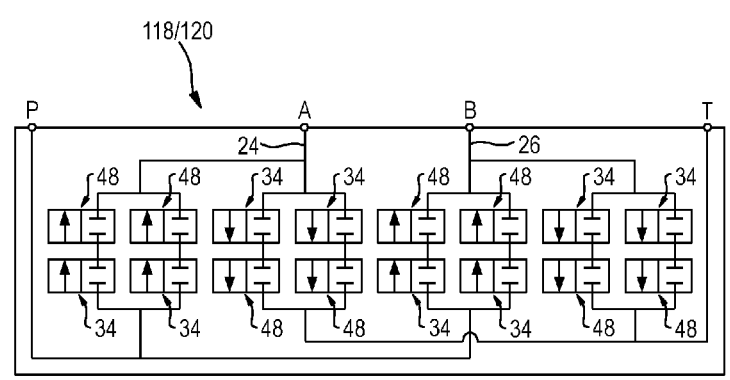
FIG. 6 shows a detail of the safety and movement control system from FIG. 1 with more precise illustration of the seat valves of the control arrangement according to a fifth exemplary embodiment.

In order to provide maximum protection by doubling the shut-off function of the control arrangement, a further shut-off seat valve 48 (FIG. 6) or blocking element which is connected in a series with respect to the seat valve or valves 34 can be arranged in the working line or lines of the control arrangement.

A hydraulic safety and movement control system having an actuating cylinder or a hydraulic motor which serves to set a fitting which is preferably relevant to safety and by means of which a fluid flow, for example of a power plant or of a turbine is regulated, is disclosed. The system has a hydraulic control arrangement by means of which a piston or a piston rod of the actuating cylinder or a motor shaft of the hydraulic motor can be moved continuously in a control mode or normal mode. Furthermore, the system has a hydraulic safety arrangement or safety circuit by means of which the piston and/or the piston rod or the motor shaft and therefore the fitting can be moved into a predetermined safe position in the event of a system failure or in an emergency mode. The safety arrangement can have precisely one main line by means of which the chambers of the actuating cylinder or the ports of the hydraulic motor can be connected to one another. The actuating cylinder or the hydraulic motor can therefore be switched without force or effect in such a way that the fitting moves into a preferred position. The safety arrangement can also have one main line per chamber or port, by means of which main line the chamber or the port can be connected to a high-pressure port or pump port or to a low-pressure port or tank port. Each main line can be opened and closed by means of just one seat valve or a plurality of seat valves. The control arrangement has two working lines, by means of each of which a pump port and alternatively a tank port can be connected to the two chambers of the actuating cylinder or to the two ports of the hydraulic motor. This results in four connections of the control arrangement. In this context, each of the four connections can be opened and closed by means of just one seat valve or a plurality of seat valves connected in parallel, with the result that all the main valves of the system are embodied using seat valve technology.

LIST OF REFERENCE SYMBOLS

1 Actuating cylinder
2 Main valve
4 First chamber
6 Second chamber
8 Control arrangement
10 Safety arrangement
12 Main line
14 Seat valve
16 Seat valve
18; 118 Control block
20; 120 Valve arrangement
22 Lifting magnet
24 First working line
25 Second working line
28 Block
30 Block
32 Seat valve which can be actuated ballistically
34 Seat valve which can be actuated in a digital-hydraulic fashion
A Working port
B Working port
P Pump port/high pressure
T Tank port/low pressure
a Opening position
b Opening position

The invention claimed is:

1. A hydraulic safety and movement control system comprising:
an actuator including a first chamber, a piston and a second chamber, the first chamber having a first working port configured to be selectively connected to a high-pressure port or a low-pressure port; a hydraulic control arrangement including (i) a first plurality of seat valves connected in parallel and configured to control a first connection between the first working port and the high- pressure port, (ii) and a second plurality of seat valves connected in parallel and configured to control a second connection between the first working port and the low-pressure port so as to continuously move the actuator; and a hydraulic safety arrangement configured to move the actuator, wherein the hydraulic safety arrangement includes including at least one main line connected to connecting the first chamber only to the second chamber actuator, and at least one safety arrangement seat valve arranged in the main line and configured to open and close the at least one main line between the first chamber and the second chamber.

2. The safety and movement control system according to claim 1, wherein:
at least one of the first plurality of seat valves is configured to be actuated ballistically by electronics, and at least one of the second plurality of seat valves is configured to be actuated ballistically by electronics.

3. The safety and movement control system according to claim 2, wherein a first self-testing safety block is arranged in the first connection in parallel to the first plurality of seat valves and a second self-testing safety block is arranged in the second connection in parallel to the second plurality of seat valves.

4. The safety and movement control system according to claim 1, wherein:
the first plurality of seat valves and the second plurality of seat valves are embodied as seat switching valves and are configured to be actuated in a digital-hydraulic fashion by electronics.

5. The safety and movement control system according to claim 4, wherein:
individual valves of the first plurality of seat valves have different opening cross sections, and
individual valves of the second plurality of seat valves have different opening cross sections.

6. The safety and movement control system according to claim 5, wherein:
the hydraulic control arrangement includes a first equalizing seat valve connected in parallel to the first plurality of seat valves in the first connection, and a second equalizing seat valve connected in parallel to the second plurality of seat valves in the second connection, and
wherein the first and second equalizing seat valves are configured to be actuated ballistically by the electronics.

7. The safety and movement control system according to claim 6, wherein:
an opening cross section of the first equalizing seat valve corresponds approximately to an opening cross section of a valve of the first plurality of seat valves having the smallest cross section, and
an opening cross section of the second equalizing seat valve corresponds approximately to an opening cross section of a valve of the second plurality of seat valves having the smallest cross section.

8. The safety and movement control system according to claim 1, wherein the hydraulic control arrangement includes (i) a first shut-off seat valve connected in series with the first plurality of seat valves in the first connection and (ii) a second shut-off seat valve connected in series with the second plurality of seat valves in the second connection.

9. The safety and movement control system according to claim 1, wherein at least one seat valve of each of the first and second pluralities of seat valves has a failsafe closed position or is configured to detect a closed position of the at least one seat valve.

10. The safety and movement control system according to claim 1, wherein the first and second pluralities of seat valves are configured to be actuated or adjusted manually.

11. The safety and movement control system according to claim 1, wherein:
the at least one safety arrangement seat valve includes a plurality of safety arrangement seat valves connected in series in the main line, and
the main line is configured to be opened and closed only by the plurality of safety arrangement seat valves.

12. The safety and movement control system of claim 1, wherein the actuator is a double-acting actuating cylinder including the first chamber and the second chamber.

13. The safety and movement control system according to claim 12, wherein:

the second chamber includes a second working port configured to be selectively connected to the high-pressure port or the low-pressure port, the hydraulic control arrangement includes a third plurality of seat valves connected in parallel and configured to control a third connection between the second working port and the high-pressure port, and the hydraulic control arrangement includes a fourth plurality of seat valves connected in parallel and configured to control a fourth connection between the second working port and the low-pressure port.

14. The safety and movement control system of claim 12, wherein the at least one main line includes only one main line connecting the first chamber only to the second chamber.

15. The safety and movement control system of claim 14, wherein the only one main line forms a closed connection between the first chamber and the second chamber when each valve of the at least one safety arrangement seat valve is open.

* * * * *

UNITED STATES PATENT AND TRADEMARK OFFICE
CERTIFICATE OF CORRECTION

| | | |
|---|---|---|
| PATENT NO. | : 9,458,944 B2 | Page 1 of 1 |
| APPLICATION NO. | : 14/181248 | |
| DATED | : October 4, 2016 | |
| INVENTOR(S) | : Dirk Bracht et al. | |

It is certified that error appears in the above-identified patent and that said Letters Patent is hereby corrected as shown below:

In the Claims

In Column 7, Lines 56-60, Lines 14-18 of Claim 1 should read:

actuator; and a hydraulic safety arrangement config-
ured to move the actuator, the hydraulic safety
arrangement including at least one main line
connecting the first chamber only to the
second chamber and at least one safety Signed and Sealed this
Twenty-fourth Day of January, 2017

Michelle K. Lee
*Director of the United States Patent and Trademark Office*